(12) United States Patent
Childs et al.

(10) Patent No.: US 9,837,906 B1
(45) Date of Patent: Dec. 5, 2017

(54) MULTIPHASE DCDC CONVERTER WITH ASYMMETRIC GM

(71) Applicant: Dialog Semiconductor (UK) Limited, London (GB)

(72) Inventors: Mark Childs, Swindon (GB); Carsten Barth, Schwaebisch Gmuend (DE); Jens Masuch, Munich (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/263,732

(22) Filed: Sep. 13, 2016

(51) Int. Cl.
*H02M 3/158* (2006.01)
*H02M 1/14* (2006.01)

(52) U.S. Cl.
CPC ........... *H02M 3/1582* (2013.01); *H02M 1/14* (2013.01)

(58) Field of Classification Search
CPC ................. H02M 3/1582; H02M 1/14; H02M 2001/0067
USPC .......................................................... 323/272
See application file for complete search history.

(56) References Cited

U.S. PATENT DOCUMENTS

| | | | |
|---|---|---|---|
| 4,920,309 A * | 4/1990 | Szepesi | G05F 1/59 307/58 |
| 6,803,750 B2 | 10/2004 | Zhang | |
| 2003/0178975 A1 * | 9/2003 | Schuellein | H02M 3/1584 323/272 |
| 2005/0093525 A1 * | 5/2005 | Walters | H02M 3/1584 323/272 |
| 2009/0153110 A1 * | 6/2009 | Huang | H02M 3/1584 323/271 |
| 2010/0194361 A1 * | 8/2010 | Hardman | H02M 3/1584 323/282 |
| 2013/0051107 A1 | 2/2013 | Rettig et al. | |
| 2014/0015500 A1 * | 1/2014 | Babazadeh | H02M 3/1584 323/272 |
| 2015/0097542 A1 | 4/2015 | Repton et al. | |

OTHER PUBLICATIONS

Co-pending US Patent DS12-049, U.S. Appl. No. 14/052,844, filed Oct. 14, 2013, "Asymmetric Inductors in Multi-Phase DCDC Converters," by Andrew Repton et al, 21 pgs.
Co-pending US Patent DS15-020, U.S. Appl. No. 15/189,210, filed Jun. 22, 2016, "Hybrid Buck," by Mark Childs, 24 pgs.

(Continued)

*Primary Examiner* — Adolf Berhane
*Assistant Examiner* — Bart Iliya
(74) *Attorney, Agent, or Firm* — Saile Ackerman LLC; Stephen B. Ackerman

(57) ABSTRACT

An object of the disclosure is to provide a multiphase Buck, Boost, or other switching converter to give high efficiency over the full range of output currents, and to maximize the total output current the switching converter is able to supply, by fully utilizing every phase of the switching converter. Further, another object of this disclosure is to balance the asymmetric transconductance, such that the load share between phases is optimized for different load levels of coil value, coil type, pass-device scaling, and frequency. Still further, another object of this disclosure requires that each of the switching converter operates at a similar point of saturation current at each point along the output load range, and each phase provides a different percentage of the total output current.

19 Claims, 10 Drawing Sheets

(56) References Cited

OTHER PUBLICATIONS

Co-pending US Patent DS15-099, U.S. Appl. No. 15/214,821, filed Jul. 20, 2016, "Regulation of a Multiple Stage Switch Mode Power Converter Through an Intermediate Voltage Control," by Mark Childs, 48 pgs.

\* cited by examiner

MULTIPHASE DCDC CONVERTER WITH ASYMMETRIC GM

RELATED PATENT APPLICATIONS

This application is related to U.S. patent application Ser. No. 14/052,844, filed on Oct. 14, 2013, assigned to the same assignee as the present invention, and incorporated herein by reference in its entirety, to U.S. patent application Ser. No. 15/189,210, filed on Jun. 22, 2016, assigned to the same assignee as the present disclosure, and incorporated herein by reference in its entirety, to U.S. patent application Ser. No. 15/214,821, filed on Jul. 20, 2016, assigned to the same assignee as the present disclosure, and incorporated herein by reference in its entirety, and to U.S. patent application Ser. No. 15/701,946, filed on Sep. 12, 2017, assigned to the same assignee as the present disclosure, and incorporated herein by reference in its entirety.

BACKGROUND OF THE INVENTION

Field of the Invention

The disclosure relates generally to a multiphase Buck, Boost, and other types of DC-DC switching power converters, operating with asymmetric phases.

Description of Related Art

High performance processors, DSPs and other ASICs demand higher current and lower output voltage levels. Furthermore, this also includes increasing dynamic load and power density requirements, with special emphasis on reducing size. In order to meet these increasingly demanding requirements, Buck switching converters employing multiphase Buck topology have been introduced, as disclosed in related patent application Ser. No. 15/189,210.

FIG. 1 illustrates block diagram 100 of a multiphase Buck switching converter, of the prior art. A multiphase Buck switching converter consists of two or more Buck switching converters connected in a parallel configuration. For simplicity, a two phase multiphase Buck switching converter is shown, with parallel power stages. The first Buck switching converter consists of controller U1, switches S1 and S2, and inductor L1. The second Buck switching converter consists of controller U2, switches S3 and S4, and inductor L2. Both Buck switching converter phases share input capacitor C1 on the high side device and output capacitor C2 on the inductors. Currents I_L1, across coil L1, and I_L2, across coil L2, determine output voltage VOUT. Input voltage V_IN is applied to high side device switches S1 and S3, and capacitor C1.

FIG. 2 shows signal diagram 200 of a multiphase Buck switching converter, of FIG. 1. Controllers U1 and U2 coordinate the switching cycles of each Buck switching converter phase to insure proper phase shifting. As high side device switch S1 of controller U1 is on, current I_L1 rises and as S1 turns off, I_L1 falls. As high side device switch S3 of controller U2 is on, I_L2 rises and as S3 turns off, I_L2 falls. This allows for minimization of ripple current on the input and output capacitors, as well as improving the dynamic load response of combined current I_L1+I_L2, operating efficiencies, and power densities.

FIG. 3 illustrates generalized block diagram 300 of a multiphase Buck switching converter with "n" symmetrical Buck switching converter phases, of the prior art. As in the example of FIG. 1, the Buck switching converter phases are connected in parallel, sharing both input capacitor C1 and output capacitor C2. In addition, the switching cycles of each phase need to be synchronized to insure proper phase shifting between all of the parallel phases. Buck switching converter Phase0 consists of a controller, switches, and inductor L0. Buck switching converter Phase1 consists of a controller, switches, and inductor L1. Buck switching converter PhaseN consists of a controller, switches, and inductor LN. Icoil current I_0 is across coil L0, I_1 across L1, and I_N across LN, respectively. Input voltage V_IN is applied to all Buck switching converter high side devices, and input capacitor C1. Output voltage V_OUT is determined across output capacitor C2, from coil currents I_0, I_1, and I_N.

Additionally, it is critical to insure current balancing and for load currents to be shared evenly between phases, since prior art multiphase Buck switching converters are symmetrical, and the power stage and current control of each are the same as one another. Since all Buck switching converter phases are the same, the operating characteristics will be the same for each phase.

FIG. 4 shows operating efficiency curve 400 of a multiphase Buck switching converter, of the prior art. Dividing total Output Load Current(A) by the number of switching phases derives the Efficiency (%) curve for each individual Buck switching converter. Furthermore, the power supply system is designed to operate at worst-case conditions, such as maximum load current and minimum input voltage. Therefore, the power stage is designed to operate at maximum operating efficiency, at the high load range. This results in Narrow Optimized Operating Region 405, and a low operating efficiency at the low and medium load ranges. Unfortunately, electronic devices need a high duty cycle for low and medium output load conditions. For battery operation portable equipment, this has a negative impact on overall system power consumption and battery life.

What is needed in the art is a multiphase DC-to-DC switching converter that has optimum performance characteristics under all operating conditions.

SUMMARY OF THE INVENTION

An object of the disclosure is to provide a multiphase Buck, Boost, or other switching converter to give high efficiency over the full range of output currents, and to maximize the total output current the switching converter is able to supply, by fully utilizing every phase of the switching converter.

Further, another object of this disclosure is to balance the asymmetric transconductance, such that the load share between phases is optimized for different load levels of coil value, coil type, pass-device scaling, and frequency.

Still further, another object of this disclosure requires that each inductor of the switching converter operates at a similar point of saturation current at each point along the output load range, and each phase provides a different percentage of the total output current.

To accomplish the above and other objects, a multiphase DC-to-DC switching converter is disclosed, having asymmetric transconductance. Asymmetric phase switching converters are comprised of two or more switching converters connected in a parallel configuration. The switching converters connected in parallel are further comprised of a controller, a high side and a low side switch, and an inductor. The switching converters connected in parallel are configured to share an input capacitor across a high side device and an output capacitor across an inductor. Asymmetric transconductance is configured for optimization at the specific design of each phase of the switching converter.

The above and other objects are further achieved by a method for asymmetric transconductance, in a multiphase DC-to-DC switching converter. The steps include providing a switching converter with an output load current, enabling multi-phases asymmetrically. An asymmetric transconductance is provided, such that the load share between phases is optimized for different loads. An effective operating efficiency is provided, over low, medium, and high loads. A maximum total output current is provided, fully utilizing every phase of the switching converter.

In various embodiments, the function may be achieved by implementing "n" asymmetrical DC-to-DC switching converter phases connected in parallel.

In various embodiments, the function may be achieved by implementing a discrete phase controller to control the switching phases of a multiphase DC-to-DC switching converter.

DETAILED DESCRIPTION OF THE INVENTION

In general, the present disclosure describes a multiphase DC-to-DC switching converter, where each DC-to-DC switching converter is optimized for a specific operating condition, and both the phases and transconductance are asymmetrical.

The present disclosure includes the use of a Buck switching converter with different types of coils on different phases, to optimize the Buck switching converter's performance for different modes of operation, as disclosed in related patent application Ser. No. 14/052,844.

The present disclosure includes a multiphase Buck switching converter using peak-mode and valley-mode phases individually or simultaneously, depending on the output load condition. This includes a multiphase Buck switching converter using only the peak-mode phases for low load and discontinuous control mode (DCM) operation. As the load increases, continuous control mode (CCM) phases are added, and as the load decreases, CCM phases are removed, as disclosed in related patent application Ser. No. 15/189,210.

Additional embodiments include varying the peak-mode and valley-mode currents of all phases together, using the same operational transconductance amplifier (OTA), and using a peak current servo to match the currents for better efficiency, as disclosed in related patent application Ser. No. 15/701,946.

Figure 5:
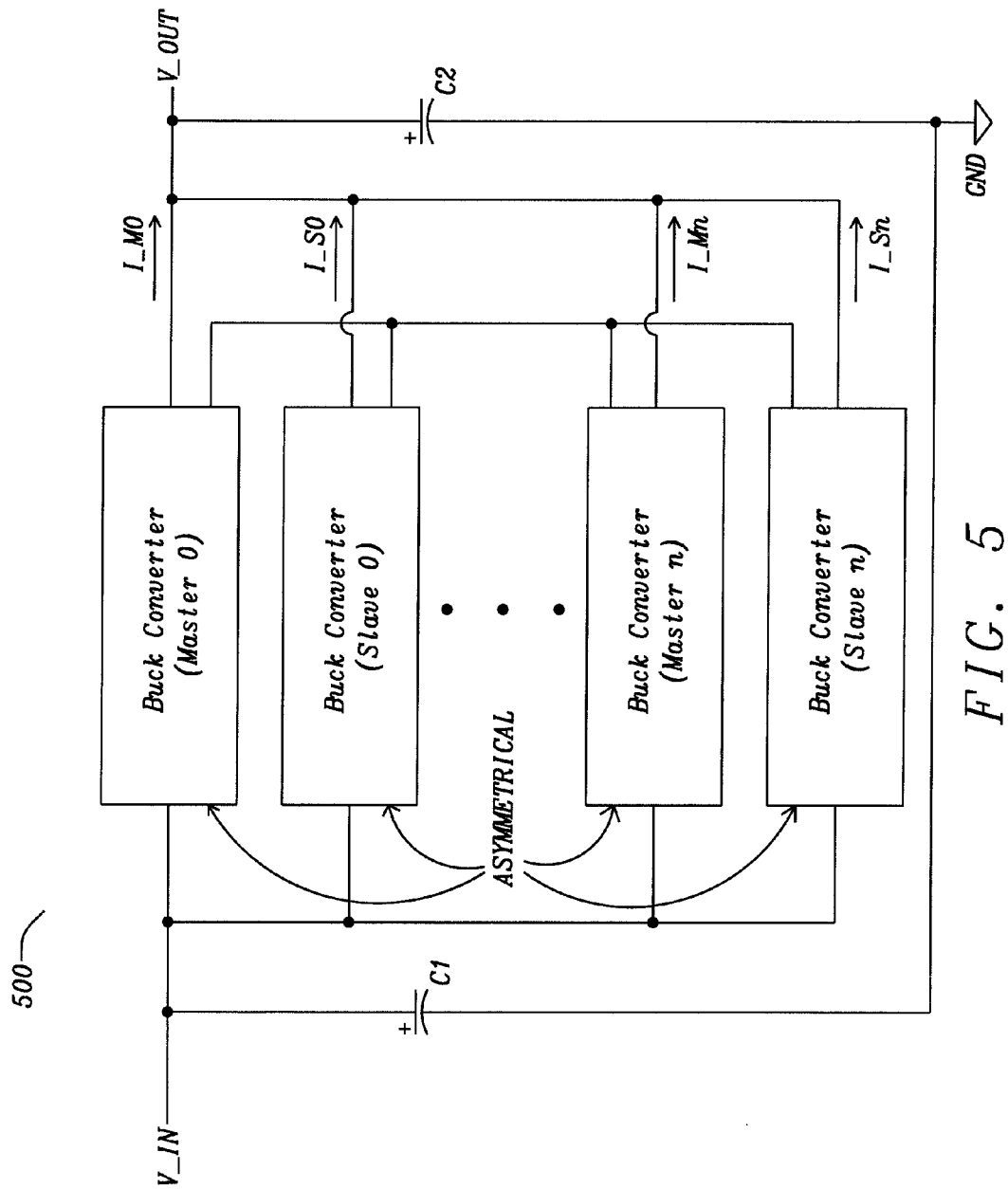
FIG. 5 illustrates "n" asymmetrical Buck switching converter phases connected in parallel to maintain the general benefits of multiphase Buck switching converters.

FIG. 5 illustrates "n" asymmetrical Buck switching converter phases 500 connected in parallel to maintain the general benefits of multiphase Buck switching converters. Depending on the operating conditions, one or more phases may be in operation at any one time. There are Buck switching converter phases that operate as master phases, such as Master0 and MasterN, and Buck switching converter phases that operate as slave phases, such as Slave0 and SlaveN. There is no limit to the number of master phases and slave phases of the multiphase Buck switching converters of the disclosure.

The Buck switching converter phases of FIG. 5 are connected in parallel, sharing both input capacitor C1 and output capacitor C2. In addition, the switching cycles are asymmetrical between all of the parallel phases of the switching converters. Buck switching converter Master0 consists of a controller, switches, and an inductor. Buck switching converter Slave0 consists of a controller, switches, and an inductor. Buck switching converter MasterN consists of a controller, switches, and an inductor. Buck switching converter SlaveN consists of a controller, switches, and an inductor. Coil current I_M0 is across the inductor of Master0, I_S0 across the inductor of Slave0, I_MN across the inductor of MasterN, and I_SN across the inductor of SlaveN, respectively. Input voltage V_IN is applied to all Buck switching converter high side devices, as well as input capacitor C1. Output voltage V_OUT is determined across output capacitor C2, from coil currents I_M0, I_S0, I_MN, and I_SN.

Figure 6:
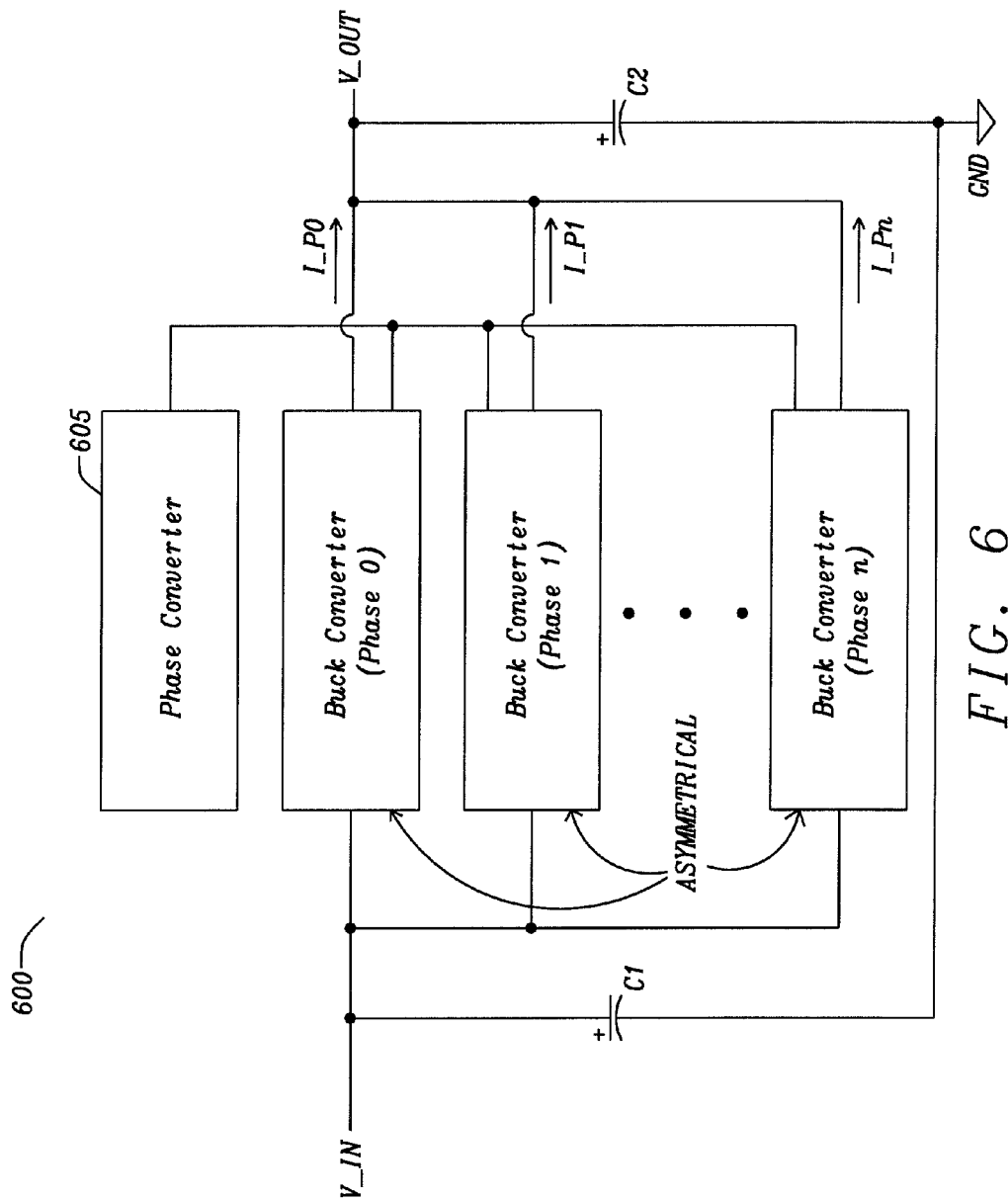
FIG. 6 shows a discrete phase controller employed to control the switching phases of a multiphase Buck switching converter.

FIG. 6 shows a discrete phase controller employed to control the switching phases of multiphase Buck switching converter 600. This differs from the master and slave control detailed in FIG. 5, in that phase controller 605 determines all Buck switching converter phases of operation. The discrete phase controller synchronizes itself with a particular phase of a Buck switching converter input, and switches this phase off, triggering VOUT.

The Buck switching converter phases of FIG. 6 are connected in parallel, sharing both input capacitor C1 and output capacitor C2. In addition, the switching cycles are asymmetrical between all of the parallel phases of the switching converters. Buck switching converter Phase0 consists of a controller, switches, and an inductor. Buck switching converter Phase1 consists of a controller, switches, and an inductor. Buck switching converter PhaseN consists of a controller, switches, and an inductor. Coil current I_P0 is across the inductor of Phase0, I_P1 across the inductor of Phase1, and I_PN across the inductor of PhaseN, respectively. Input voltage V_IN is applied to all Buck switching converter high side devices, as well as input capacitor C1. Output voltage V_OUT is determined across output capacitor C2, from coil currents I_P0, I_P1, and I_Pn.

The phases operating at low current use a low switching frequency controlled by a peak-mode current control system. The phases operating only at high current then use a high switching frequency and a valley-mode current control system.

As the number of phases used in the Buck switching converter increases, it becomes more beneficial to use more combinations of different phases. For example, at very low current, the Buck switching converter may use only a single high efficiency phase. At higher currents, more phases are allowed to switch until, at the maximum current, all phases are enabled. In this way the Buck switching converter performance may more closely match the requirements for each load range.

Figure 7:
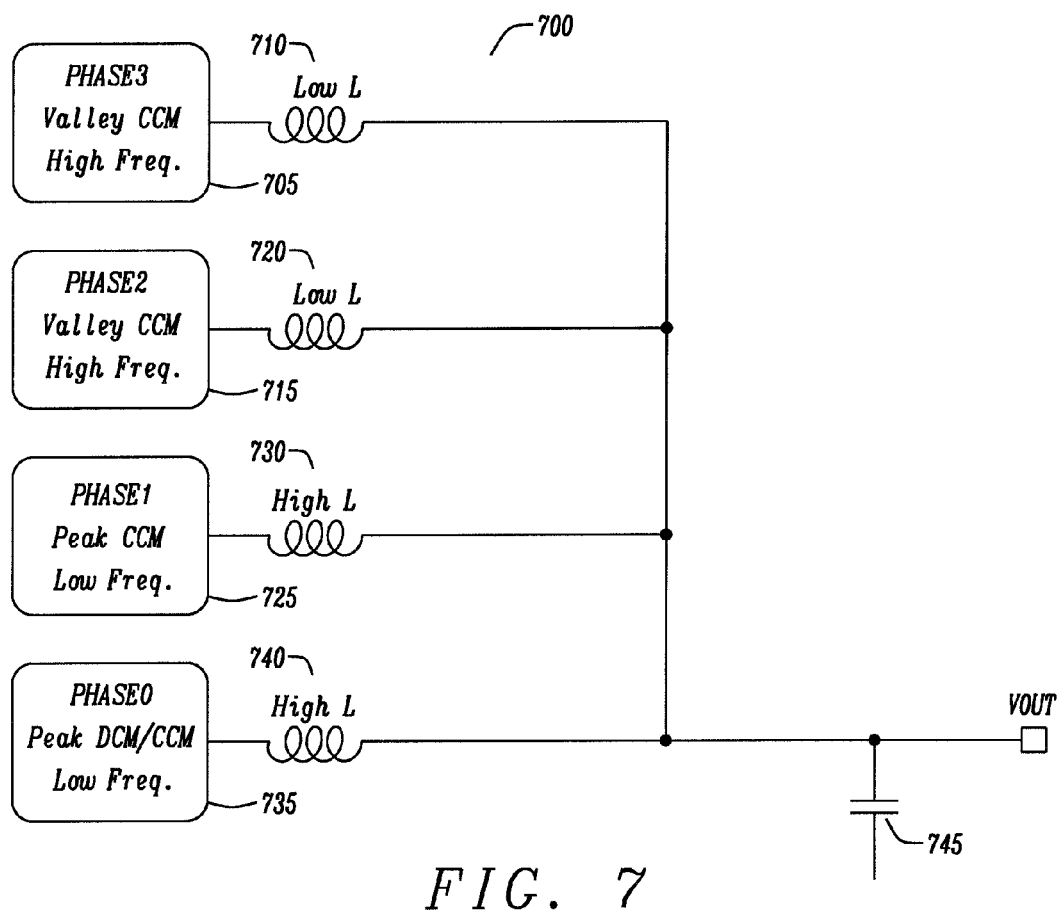
FIG. 7 is a block diagram illustrating a Hybrid Buck switching converter, using both peak-mode and valley-mode current phases.

FIG. 7 is block diagram 700 illustrating a Hybrid Buck switching converter, using both peak-mode and valley-mode current phases. Master Phase0 735 is defined, which will operate at low loads. This master phase will use peak-mode control and support discontinuous and continuous modes of operation. Slave Phase1 725 is defined, with inductor 730, which will operate at low frequency and high inductance. This slave phase does not support DCM, but will operate only in continuous conduction mode. The master phase would typically use a much lower switching frequency, and a much larger and higher value inductor than inductor 740. The slave phases Phase2 715 and Phase3 705 would then typically use a much higher switching frequencies and much smaller value inductors, 720 and 710, respectively. This simplifies the valley-mode phase design substantially, and the output voltage VOUT is stored across capacitor 745.

There is no limit to how many master and slave phases are defined. Multiple master phases may operate at different frequencies and with different coil values. Multiple slave phases may operate at different frequencies and with different coil values. Not all peak mode phases must support DCM operation but at least one should.

Figure 8:
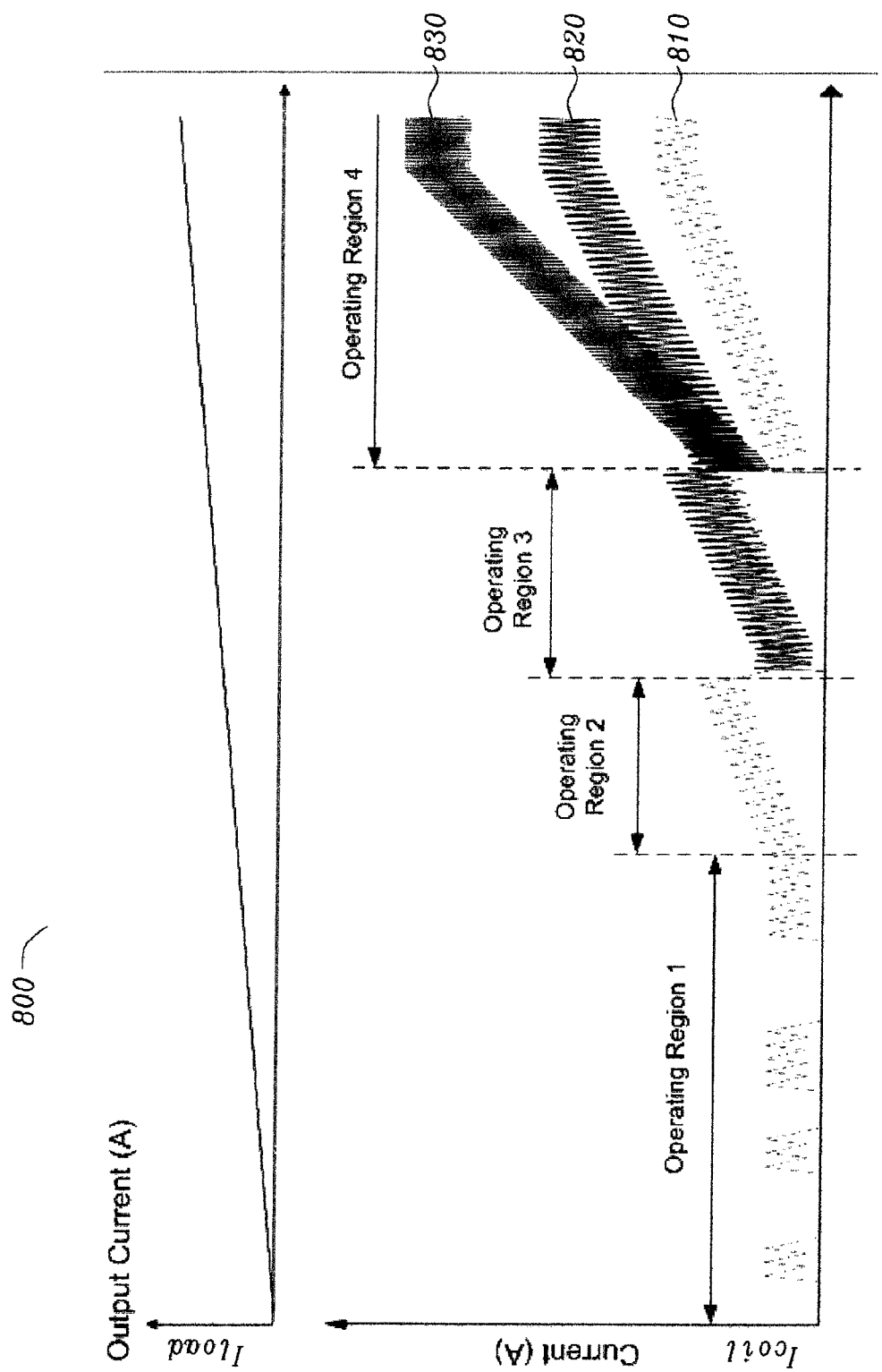
FIG. 8 shows waveforms for a multiphase Buck switching converter, that include four switching converter phases.

FIG. 8 shows waveforms 800 for a multiphase Buck switching converter, that includes, as an example only, four switching converter phases. Only Master Phase 810, operating at low loads using peak-mode control, supports discontinuous mode operation in region 1, and continuous conduction mode in region 2, with a large high efficiency coil at low switching frequency, corresponding to Phase0 of FIG. 7. Second phase 820 is added, and load current I_LOAD increases, as shown by region 3. The second phase, corresponding to Phase1 of FIG. 7, operates at a relatively low switching frequency, with a relatively large value inductor. At high loads all phases are enabled, adding two phases in 830, as shown by region 4. The two additional phases, corresponding to Phase2 and Phase3 of FIG. 7, operate with very small value coils at high frequency. These coils allow better ICOIL transient response and high phase currents at the expense of static efficiency. The slave phases, using peak and valley-mode controls, support continuous conduction mode.

The ICOIL current of master 810 and slave phases 820 and 830 are controlled by an OTA control current programmed to a maximum value. Only a single OTA is provided, and the output from this is used for both the master and the slave phases. The OTA current defines the peak coil current in the master and slave peak-mode phases for lower frequencies and larger inductors, and the valley coil current in the slave valley-mode phases for higher frequencies and smaller inductors. Using peak-mode control in master and slave phases, and valley-mode control in slave phases, allows the Buck switching converter to regulate VOUT correctly as a single converter, balancing the coil currents between the peak-mode and valley-mode phases.

The present disclosure allows for an asymmetric multiphase DC-to-DC switching converter, comprised of switching converter phases optimized for specific operating conditions. Each phase has an optimized transconductance (gm) based on the specific design of the particular DC-to-DC switching converter. Each phase is seen as a voltage controlled current source, with a given gm defined as $gm_x$, x referring to the phase. For example, the overall transconductance of a four phase switching converter, when operating with only a single phase is $gm_1$. When the second phase is enabled, the overall transconductance of the switching converter becomes $gm_1+gm_2$. When all four phases are enabled, the overall transconductance of the switching converter increases to $gm_1+gm_2+gm_3+gm_4$.

The stability of the switching converter is directly dependent on the total transconductance. The switching converter must be designed to be stable with the maximum gm. The switching converter control loop and the minimum output capacitance required to stabilize the switching converter are set for the highest current condition, which has the highest gain. What this means is that, for operating regions using fewer phases, the switching converter is operating in a non-optimal condition. For example, the static voltage regulation is poorer when the switching converter is operating with fewer phases.

The present disclosure allows for the transconductance value of each phase to be set according to the load range that a phase is designed to operate in, over the entire load range of the multiphase Buck switching converter. As shown in region 4 of FIG. 8, this can be used to insure each phase reaches the desired current at approximately the same time. When a particular phase is designed to operate efficiently at low load conditions, the maximum current that the phase will provide to the load will be limited, based on the optimum operating point of that phase. For example, in a four phase switching converter, a phase optimized for high efficiency at low output current levels will provide less than 25% of the output load current at high output current conditions. Conversely, a phase that is designed for high operating efficiency at high output current levels will provide less than 25% of the total output load current at low output current conditions.

Furthermore, since each phase is designed for operation based on different operating parameters, the inductor design of each phase is optimized, rather than using the same inductor value for each phase. In a preferred embodiment, the inductors of each phase operate at one point of saturation current $I_{SAT}$ at each point along the output load range, while each phase provides a different percentage of the total output current.

Figure 1:
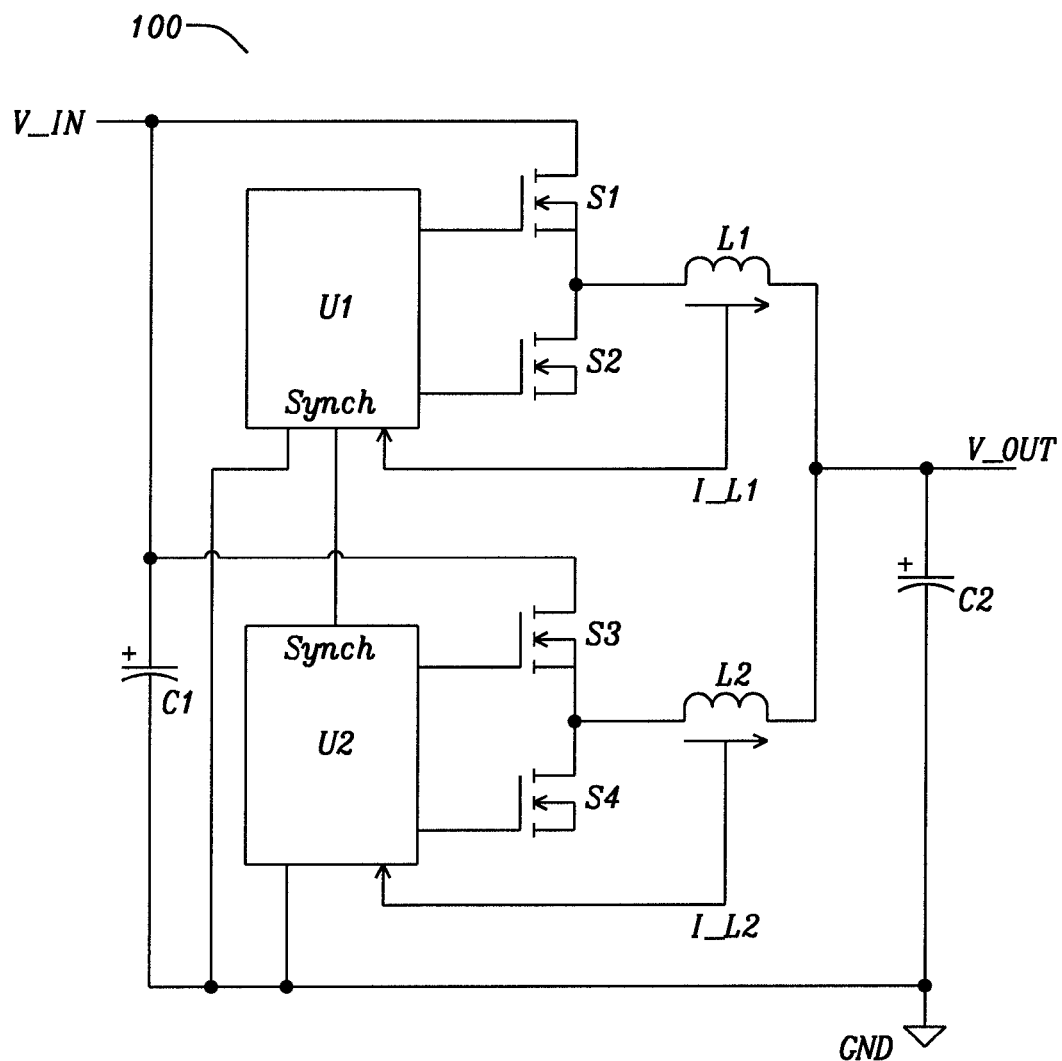
FIG. 1 illustrates a block diagram of a multiphase Buck switching converter, of the prior art.
Figure 2:
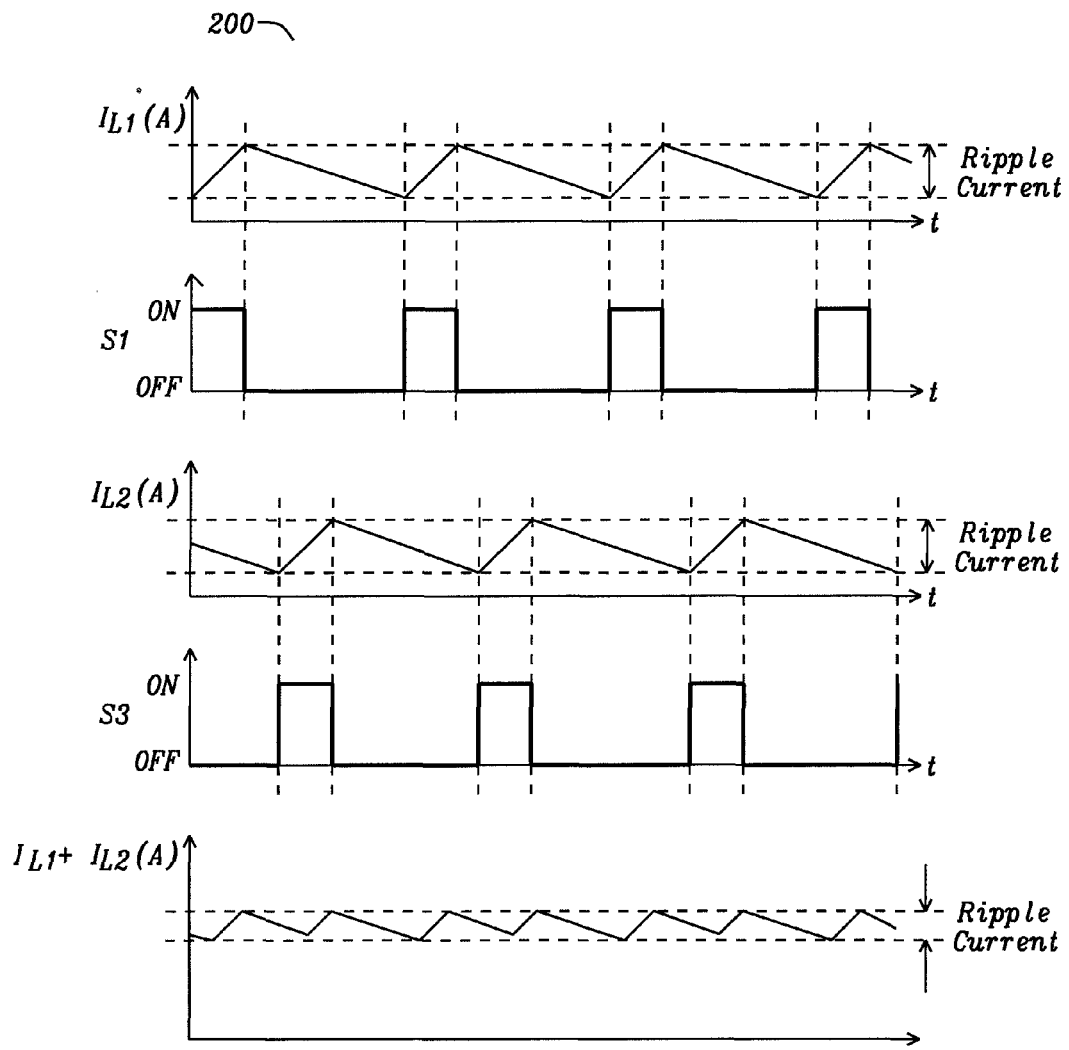
FIG. 2 shows a signal diagram of a multiphase Buck switching converter, of the prior art.
Figure 3:
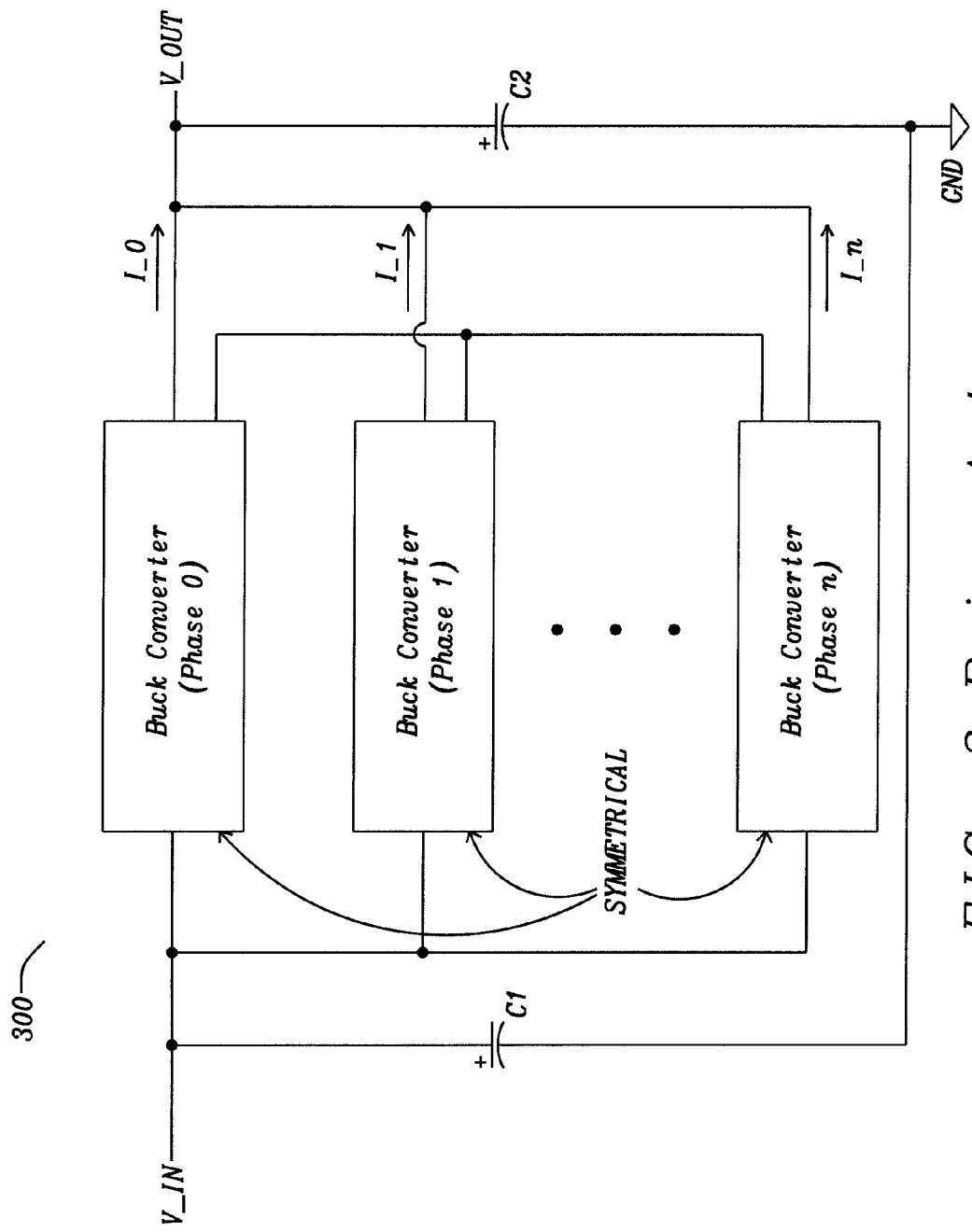
FIG. 3 illustrates a generalized block diagram of a multiphase Buck switching converter, with "n" symmetrical Buck switching converter phases, of the prior art.
Figure 4:
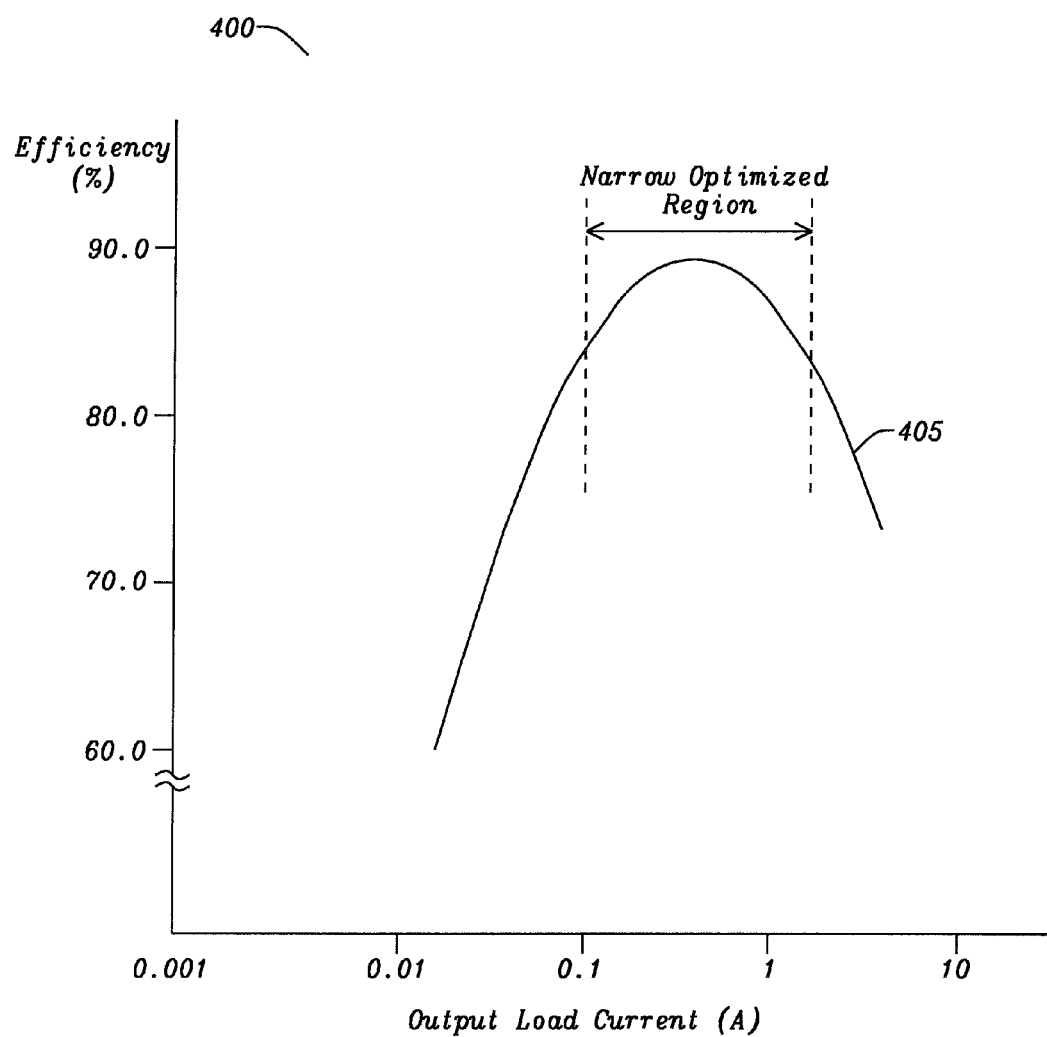
FIG. 4 shows an operating efficiency curve of a multiphase Buck switching converter, of the prior art.
Figure 9:
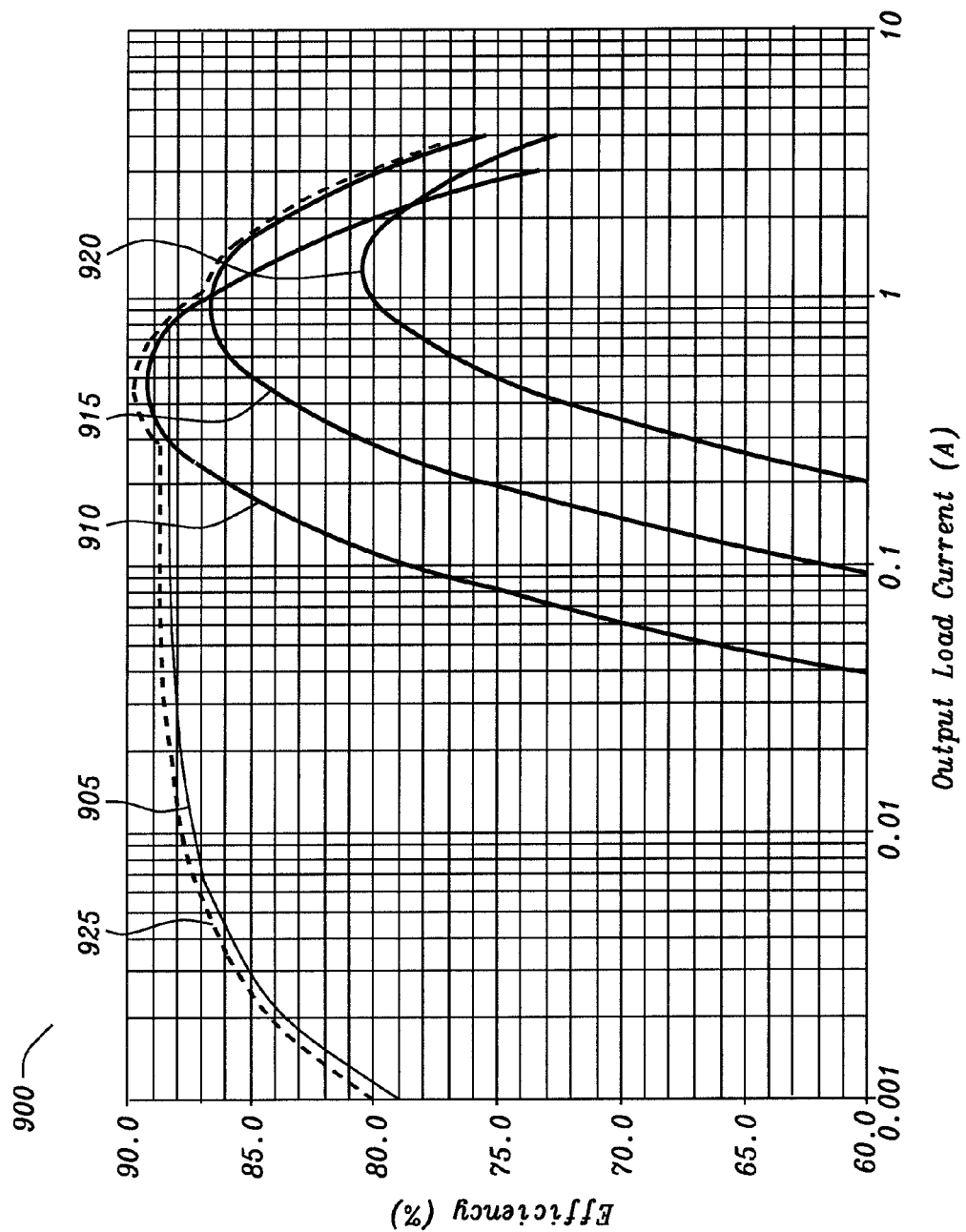
FIG. 9 illustrates the operational efficiency of a multiphase DC-to-DC switching converter, embodying the principles of the disclosure.

FIG. 9 illustrates operational efficiency 900 of a multiphase DC-to-DC switching converter, embodying the principles of the disclosure. FIG. 9 shows the phases optimized for four different output current ranges. Depending on the output load current, in contrast to FIG. 4, a combination of one to four phases are enabled to provide the total load current asymmetrically, maximizing the operating efficiency over the entire output load range. Dividing total output Load Current(A) by the number of switching phases derives the effective operating Efficiency (%) curve for each of the four phases of the DC-to-DC switching converter. The optimized operating regions 905, 910, 915, and 920 create an effective operating efficiency 925 over low, medium, and high load ranges. For battery operation portable equipment, this has a positive impact on overall system power consumption and battery life.

Figure 10:
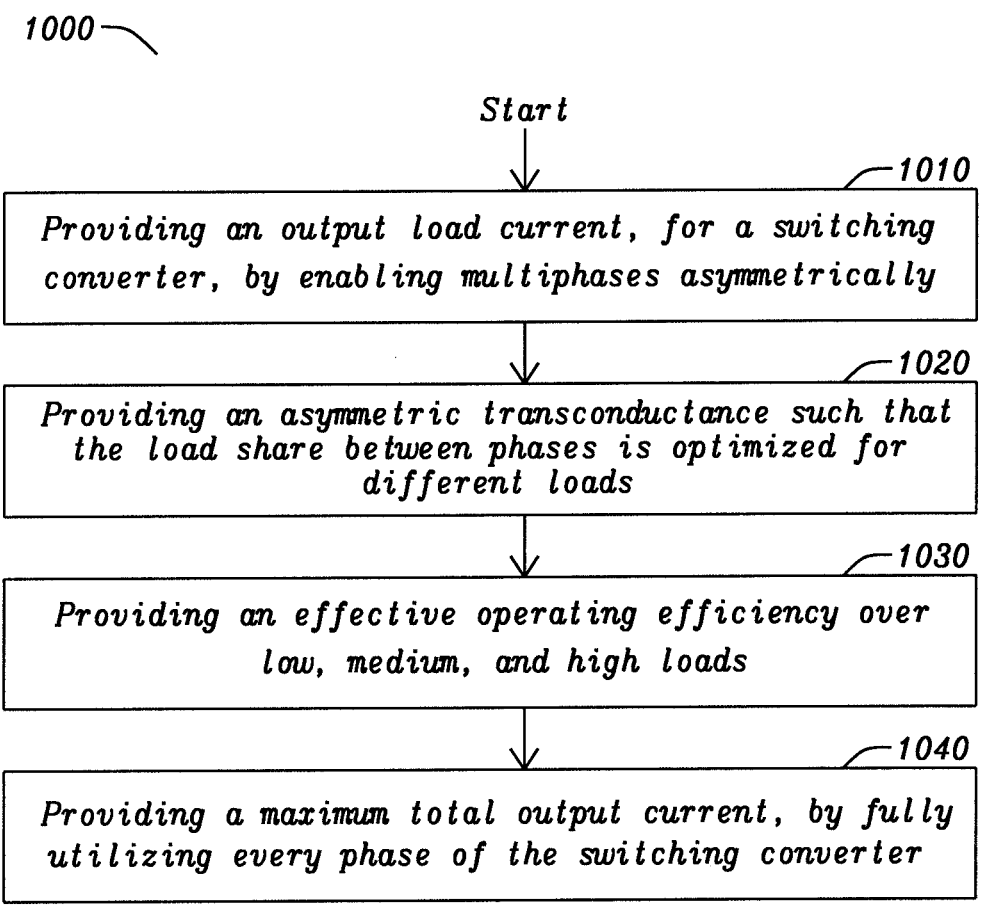
FIG. 10 is a flow chart of a method for a multiphase DC-to-DC switching converter, embodying the principles of the disclosure.

FIG. 10 is flow chart 1000 of a method for a multiphase DC-to-DC switching converter, embodying the principles of the disclosure. Step 1010 shows a switching converter providing an output load current, by enabling multi-phases asymmetrically. Step 1020 shows a switching converter providing an asymmetric transconductance, such that the load share between phases is optimized for different loads. Step 1030 shows a switching converter providing an effective operating efficiency, over low, medium, and high loads. Step 1040 shows a switching converter providing a maximum total output current, by fully utilizing every phase of the switching converter.

The advantages of one or more embodiments of the present disclosure include optimization of efficiency for every phase over the entire range of operation, solving a fundamental problem of the asymmetric coil configuration. The proposal allows for a DC-to-DC Switching Converter to have better load transient performance and smaller PCB area without compromising efficiency.

While this invention has been particularly shown and described with reference to the preferred embodiments thereof, it will be understood by those skilled in the art that various changes in form and details may be made without departing from the spirit and scope of the invention.

The invention claimed is:

1. A multi-phase DC-to-DC switching converter, comprising:
   two or more asymmetric phases, each of said asymmetric phases configured for optimizing efficiency at different loads levels of output current and, further comprising:
   said asymmetric phases are connected in parallel;
   each of said asymmetric phases comprises a controller, a high side switch and a low side switch;
   said asymmetric phases having asymmetric transconductance, with said asymmetric transconductance of each said asymmetric phase set according to an output current load range that said asymmetric phase is designed to operate in.

2. The multi-phase DC-to-DC switching converter of claim 1, wherein the multi-phase DC-to-DC switching converter is a multi-phase Buck switching converter.

3. The multi-phase DC-to-DC switching converter of claim 1, wherein the multi-phase DC-to-DC switching converter is a multi-phase Buck-Boost switching converter.

4. The multi-phase DC-to-DC switching converter of claim 1, wherein the multi-phase DC-to-DC switching converter is a Boost switching converter.

5. The multi-phase DC-to-DC switching converter of claim 1, wherein an overall transconductance comprises the summation of the individual asymmetric transconductance of each phase.

6. The multi-phase DC-to-DC switching converter of claim 5, wherein said overall transconductance is configured to share said output load between said asymmetrical phases.

7. The multi-phase DC-to-DC switching converter of claim 1, further comprising an output voltage across an output capacitor and a plurality of inductor, wherein each said asymmetric phase comprises one of said plurality of inductors.

8. The multi-phase DC-to-DC switching converter of claim 1, wherein said asymmetric phases are configured to operate at similar points of saturation current for an output load range.

9. The multi-phase DC-to-DC switching converter of claim 1, wherein said asymmetric phases are master and slave phases connected in parallel, one or more phases may be in operation at any one time, and there is no limit to the number of master phases and slave phases.

10. The multi-phase DC-to-DC switching converter of claim 1, wherein the multi-phase DC-to-DC switching converter is configured with a discrete phase controller to control the switching phases of said multiphase DC-to-DC switching converter.

11. A method for operating a DC-to-DC switching converter, comprising the steps of:
    providing multiple asymmetric phases, for said switching converter, connected in parallel to provide a single output load current;
    providing an asymmetric transconductance for each of said multiple phases, sharing said output load current between said multiple asymmetric phase; and
    setting the asymmetric transconductance of each phase according to a load range that the phase is designed to operate in.

12. The method for operating the DC-to-DC switching converter of claim 11, wherein the multi-phase DC-to-DC switching converter is a multi-phase Buck switching converter.

13. The method for operating the DC-to-DC switching converter of claim 11, wherein the multi-phase DC-to-DC switching converter is a multi-phase Buck-Boost switching converter.

14. The method for operating the DC-to-DC switching converter of claim 11, wherein the multi-phase DC-to-DC switching converter is a Boost switching converter.

15. The method for operating the DC-to-DC switching converter of claim 11, wherein said asymmetric phases reach a maximum output load current concurrently, with a single output voltage drop.

16. The method for operating the DC-to-DC switching converter of claim 11, wherein an overall transconductance comprise the summation of the individual asymmetric transconductance of each phase.

17. The method for operating the DC-to-DC switching converter of claim 16, wherein said overall transconductance shares said output load between said asymmetrical phases.

18. The method for operating the DC-to-DC switching converter of claim 11, wherein said asymmetric phases operate at similar points of saturation current for an output load range.

19. The method for operating the DC-to-DC switching converter of claim 11, wherein said asymmetric phases are individual phases providing a percentage of a total current output of said DC-to-DC switching converter.

* * * * *